(12) United States Patent
Feucht et al.

(10) Patent No.: US 6,549,837 B2
(45) Date of Patent: Apr. 15, 2003

(54) AUTOMATIC TRACKING CONTROL FOR WORK MACHINES

(75) Inventors: Timothy A. Feucht, Edelstein, IL (US); Timothy M. Gutzwiller, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 26 days.

(21) Appl. No.: 09/851,742

(22) Filed: May 9, 2001

(65) Prior Publication Data

US 2002/0169536 A1 Nov. 14, 2002

(51) Int. Cl.⁷ .................................................. G06F 7/00
(52) U.S. Cl. ............................................. 701/50; 172/3
(58) Field of Search ................................ 701/50; 172/2, 172/3, 4.5; 37/466

(56) References Cited

U.S. PATENT DOCUMENTS

| | | | | |
|---|---|---|---|---|
| 5,012,165 A | * | 4/1991 | Lautzenhiser et al. | 318/53 |
| 5,248,008 A | * | 9/1993 | Clar | 180/9.32 |
| 5,787,374 A | | 7/1998 | Ferguson et al. | |

\* cited by examiner

*Primary Examiner*—Yonel Beaulieu
(74) *Attorney, Agent, or Firm*—R Carl Wilbur

(57) ABSTRACT

In many applications, it is desirable to have work machines automatically maintain a desired speed and heading. Provided is an electronic control connected with left and right hydraulic motor assemblies that drive left and right ground engaging propulsion mechanisms, left and right speed sensors, and on operator input.

10 Claims, 3 Drawing Sheets

AUTOMATIC TRACKING CONTROL FOR WORK MACHINES

TECHNICAL FIELD

The present invention relates generally to the field of work machines, and more particularly, to control systems for use with work machines.

BACKGROUND

Many different types of work machines are manufactured that have tracks or wheels on each side of the machine that are independently controllable. Generally, an operator of such a machine is required to provide input through a joystick, steering wheel, or other operator input to control the speed of the tracks or wheels which thereby controls the speed and direction of movement of the machine. Many different applications require such machines to maintain a relatively constant heading and relatively constant speed. It would be preferable to have a system that automatically controls the speed of the tracks or wheels to help maintain the heading and speed of the machine.

One particular application where speed and heading are important is asphalt paving machines. Asphalt paving machines are used to spread asphalt relatively evenly over a desired surface. These machines are regularly used in the construction of roads, parking lots and other areas where a smooth durable surface is required for cars, trucks and other vehicles to travel. An asphalt paving machine generally includes a hopper for receiving asphalt material from a truck and a conveyor system for transferring the asphalt from the hopper for discharge on the roadbed. Screw augers spread the asphalt transversely across the road bed in front of a floating screed, which is connected to the paving machine by pivoting tow arms or draft arms. The screed smoothes and somewhat compacts the asphalt material and ideally leaves a roadbed of uniform depth and smoothness. The depth of the asphalt material is determined not only by the height of the screed, but also by the speed of the paving machine. If the machine is travelling too quickly, then less material will be laid on the roadbed and the depth will be thinner. If the paving machine is travelling slower, then more material will be laid on the roadbed and the depth will be thicker. Thus, it is preferable to have the paving machine travel at a uniform speed.

Because asphalt paving machines typically operate on roadbeds, in parking lots, and in other areas where the machine travels long straight paths laying the mat of material, it is sometimes tedious for the operator to make continual manual adjustments to the left and right track or wheel speeds to make sure that the paving machine is travelling straight and is maintaining a constant speed. Such manual adjustments will divert the operators attention away from other duties that could increase the quality of the paving job.

It would be preferable to have a control system that would cause a work machine to maintain a relatively constant heading while at the same time maintaining a relatively constant speed. The present invention is directed at overcoming one or more of the disadvantages associated with the prior art.

SUMMARY OF THE INVENTION

In one aspect of the present invention, a control system is provided that controls the direction of travel of work machines to maintain a desired heading and a desired speed. The control system preferably includes a first speed sensor associated with a left ground engaging propulsion mechanism and a second speed sensor associated with a right ground engaging propulsion mechanism. The speed sensors produce right and left speed signals which are then used by an electronic control module to produce control signals to control the speed of left and right hydraulic motor assembles, which thereby controls the heading and speed of the machines.

These and other aspects of the present invention will be apparent upon reading the following detailed description of the invention in connection with the drawings and appended claims.

BRIEF DESCRIPTION OF THE DRAWINGS

The drawings are provided to assist in the understanding of the present invention and represent a preferred embodiment of practicing the invention. Other embodiments could be created that will fall within the scope of the present invention as defined by the appended claims. In the drawings:

DETAILED DESCRIPTION

Figure 1:
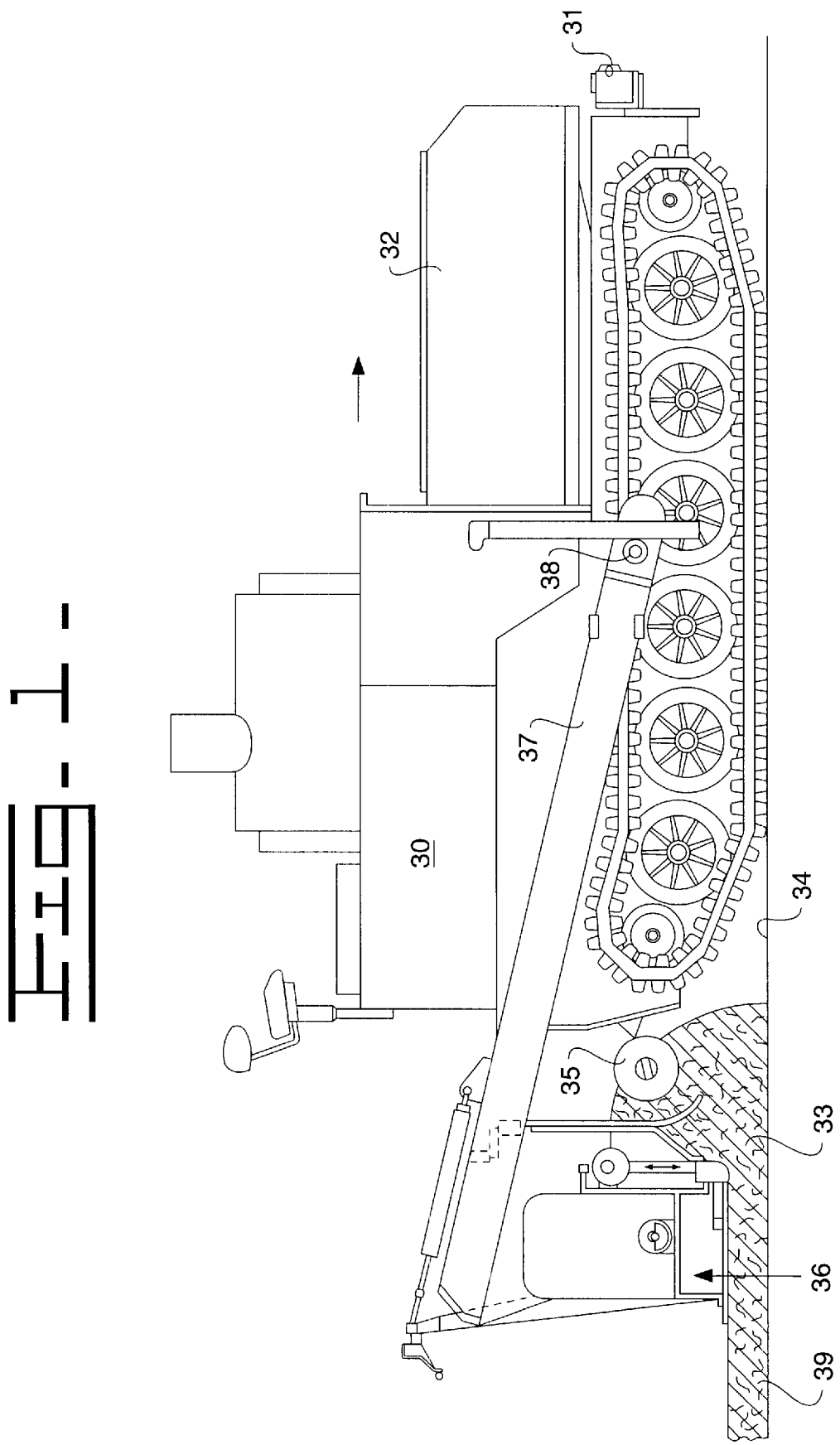
FIG. 1 is a side view of an asphalt paving machine.

A preferred embodiment of the best mode of practicing the present invention is described herein with respect to an application on an asphalt paving machine. It should be recognized, however, that the present invention may be applied to a variety of configurations of work machines including construction equipment and agricultural equipment among others, and particularly to machines where the tracks or wheels on the left side of the machines can be independently controlled from the tracks or wheels on the right side and where it is desirable to maintain a predetermined heading on such machines. Referring first to FIG. 1, a typical form of track-laying, floating screed asphalt paver 30 is shown. In accordance with well known practice, the paver is provided with push rollers 31 at the front, for engaging and pushing forwardly on the wheels of a truck loaded with asphalt paving material. The paving material is arranged to be discharged progressively from the truck into a hopper 32 at the front of the paver. Conveyor means (not shown) controllably transport the paving material to the rear of the paver and deposit it in a mass 33 on the prepared paving bed 34. Screw augers 35 distribute the paving material laterally in front of a screed, generally designated by the numeral 36. The screed is towed behind the paver and connected thereto by a pair of elongated, forwardly extending tow bars 37 connected at their front ends to the chassis of the paver. As is known to those skilled in the art, by controlling the elevation of the tow points 38 and the angle of attack of the bottom surface of the screed 36, a level, uniform paving mat 39 is laid behind the paver as it advances forwardly.

Figure 2:
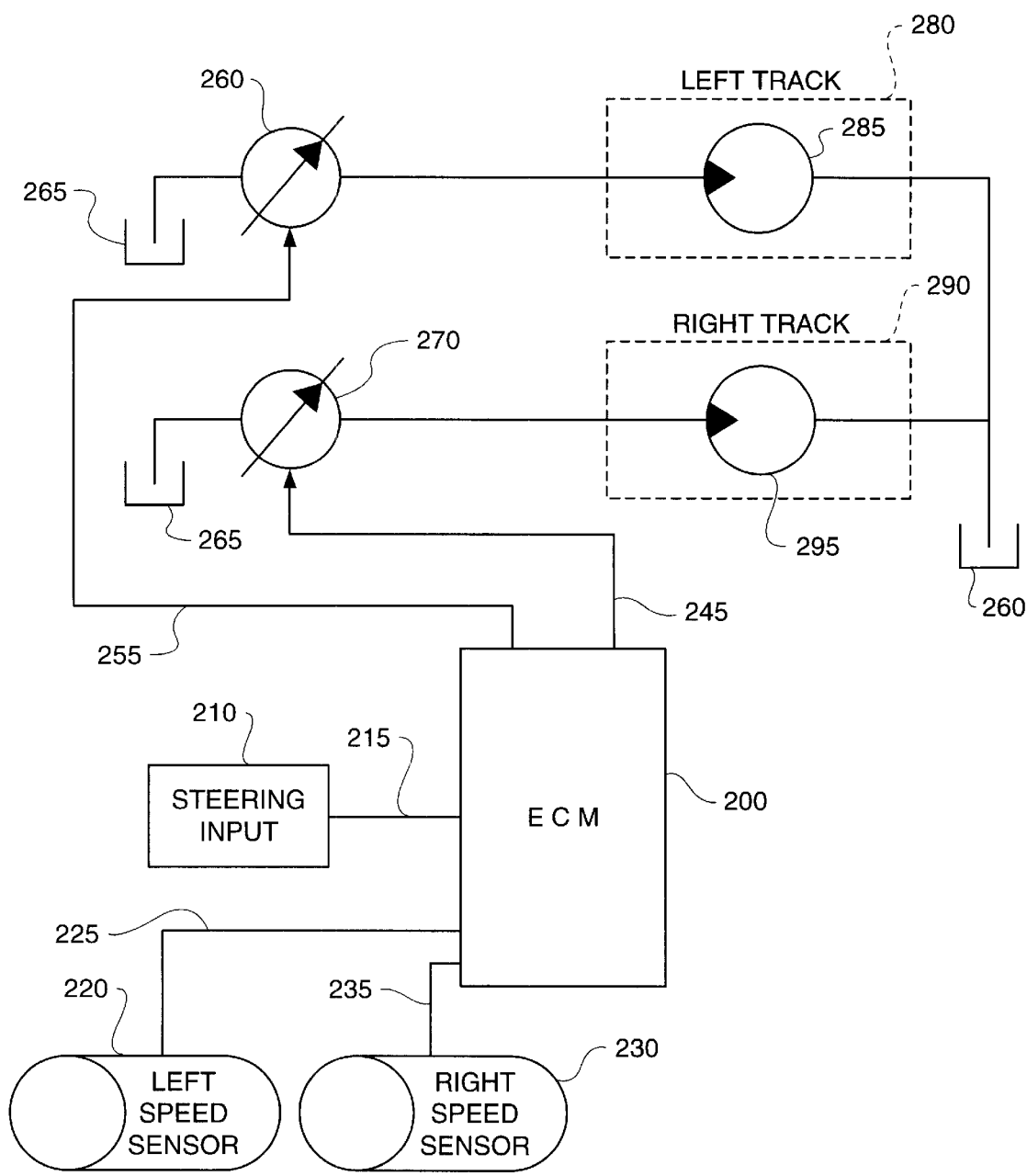
FIG. 2 is a block diagram of a control system of preferred embodiment of the present invention practiced in connection with an asphalt paving machine.

Referring next to FIG. 2, a block diagram of a preferred embodiment of the control system of the present invention and associated asphalt paving components is shown. An electronic control module (ECM) 200 is provided in the control system. Although the electronic control module 200 is shown as a single block, those skilled in the art will recognize that the electronic control module 200 may include a variety of components including a microprocessor or microcontroller, a data bus, an address bus, memory devices such as random access memory (RAM) or read only memory (ROM), power supply circuitry, and input and output signal conditioning circuitry to allow the microprocessor to communicate with devices outside the electronic control module 200. Although the various connections shown in FIG. 2 are illustrated as discrete connections to the individual components associated with the control system, a preferred embodiment of the present invention utilizes a data/control bus to transfer signals and information between the electronic control module 200 and the various system components. Such data/control buses and the associated data transfer protocols are known in the art.

As shown in FIG. 2, the electronic control module is connected with a steering input 210 through connector 215. In a preferred embodiment, the steering input 210 may be a steering wheel, joystick, or other suitable device that can provide an operator desired direction to the ECM 200. As described in more detail below with reference to FIGS. 2 and 3, when the input on connector 215 is a steering input 210 and then the ECM 200 uses that signal to determine whether the control system enters an automatic tracking mode. Preferably, the ECM 200 does this by determining whether the steering input is within a predetermined tolerance of a position indicating that the operator desires straight forward or reverse travel and the ECM 200 enters automatic tracking mode. In other embodiments, it may be preferable to have a rotary switch that has a plurality of different selectable modes, where each of such modes produces a signal on connector 215 indicative of the selected mode. If the paving machine includes a rotary switch or other mode selection device, then the ECM 200 will read the signal on connector 215 and determine whether the operator has selected the automatic mode.

In a preferred embodiment, hydraulic motor assemblies 280, 290 are associated with a left ground engaging propulsion mechanism and right ground engaging propulsion mechanism of the paving machine 30. Those skilled in the art will recognize that asphalt pavers typically are equipped with either tracks or wheels. Applicants use of the term ground engaging propulsion mechanism encompasses both such configurations. In the Figure the hydraulic motor assemblies 280, 290 are shown as fixed displacement motors. Although a preferred embodiment of the present invention includes hydraulic motor assemblies 280, 290 which have fixed displacement hydraulic motors 285, 295, those skilled in the art will recognize that the hydraulic motor assembly could be replaced with other discrete components which control fluid flow to a motor, or the hydraulic motor assembly 280, 290 could simply be replaced with a variable displacement motor. The present invention is therefore not limited to the single configuration shown in FIG. 2.

The control system preferably includes a first and second variable displacement pump 270, 260 that are hydraulically connected with a tank or other supply of hydraulic fluid 265 and with the hydraulic motor assemblies 280, 290. As is known to those skilled in the art, the variable displacement pumps are connected with a power supply (not shown), which typically is the power plant for the asphalt paving machine. The flow of hydraulic fluid is controlled by the angle of the swash plate. The angle of the swash plate is generally determined by a control signal which may be produced by the electronic control module 200. Although a preferred embodiment of the present invention shows the use of a variable displacement pump, those skilled in the art will recognize that a fixed displacement pump could readily and easily be substituted without deviating from the scope of the present invention.

The electronic control module 200 is preferably connected with the variable displacement pumps 270, 260 with connectors 245, 255 as shown in the Figure. As is described in more detail below, the electronic control module 200 produces signals on the connectors 245, 255 to control the flow of hydraulic fluid produced by the variable displacement pumps 270, 260 and thereby control the flow to the hydraulic motor assemblies 280, 290, which controls the power applied to the left and right ground engaging propulsion mechanisms.

The electronic control module 200 is also connected with speed sensors 220, 230 by connectors 225, 235. The speed sensors 220, 230 are associated with the left ground engaging propulsion mechanism and the right ground engaging propulsion mechanism. The left speed sensor 220 produces a signal on connector 225 which is indicative of the speed of the left ground engaging propulsion mechanism. The right speed sensor 230 produces a signal on connector 235 which is indicative of the speed of the right ground engaging propulsion mechanism.

Figure 3:
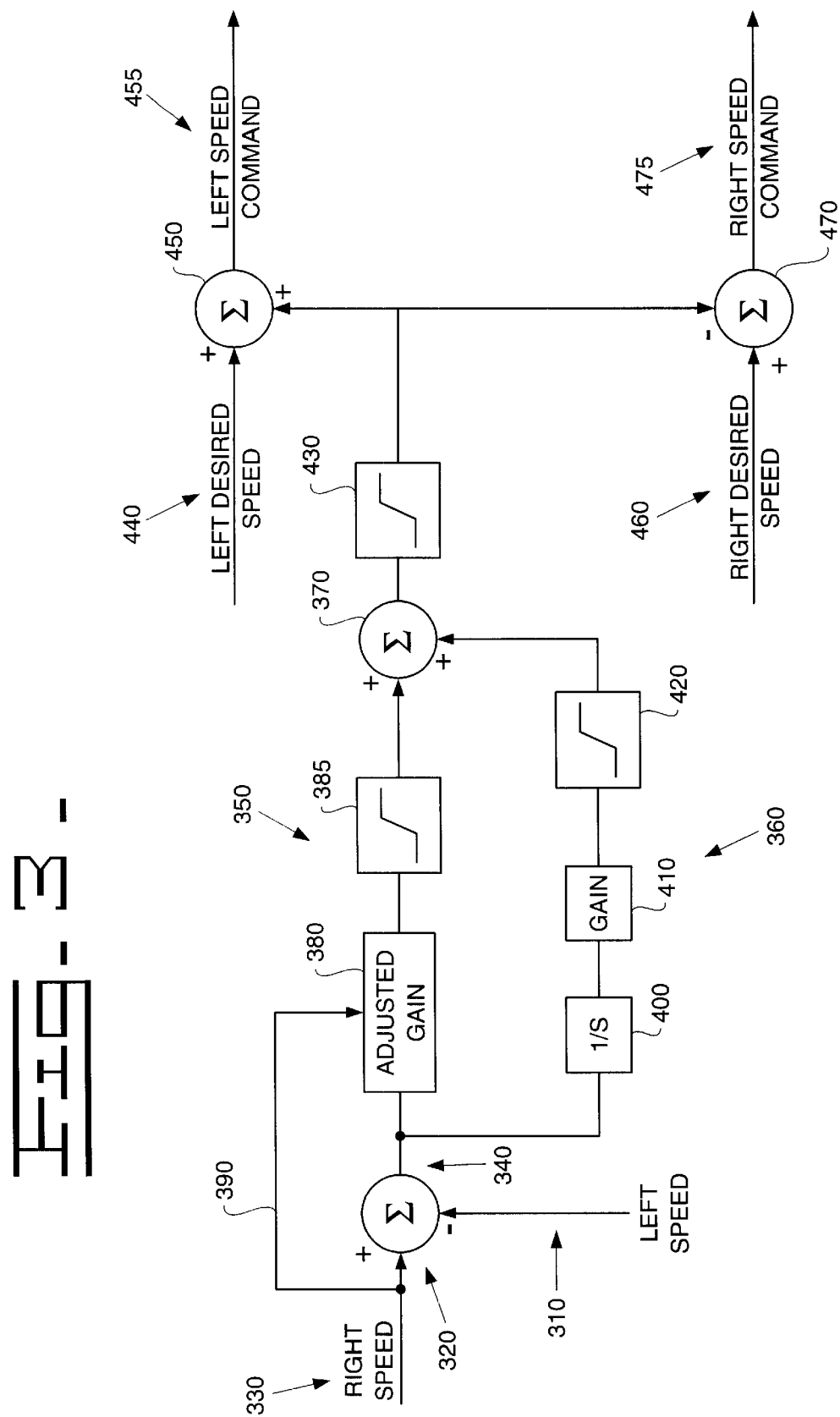
FIG. 3 is a control block diagram of a preferred embodiment of the control implemented by the electronic control module.

Referring now to FIG. 3, a block diagram 300 of a preferred embodiment of a control strategy practiced in accordance with the control system of the present invention is shown. In general, the block diagram represents a closed loop proportional-integral (PI) control, that uses both left and right speed signals to calculate the inputs, or command signals, to independent speed controls for the left and right ground engaging propulsion mechanism. The output of those independent speed controls then produces the control signals to the variable displacement pumps 270, 260, which thereby varies the power produced by the ground engaging propulsion mechanism.

The control strategy described herein is implemented in the electronic control module 200. The left speed sensor signal 310 produced by the left speed sensor 220 on connector 225 is a negative input to summing junction 320. The right speed sensor signal 330 produced by the right speed sensor 230 on connector 235 is an input to the summing junction 320. The output 340 of the summing junction is the difference between the right speed sensor signal 330 and the left speed sensor signal 310. The output 340 is then fed through a proportional loop 350 and an integral loop 360 which are then fed into a second summing junction 370.

The proportional loop 350 includes an adjustable gain block 380. The value of the gain preferably is a function of the speed of the machine. Many machines have difficulty maintaining a straight course when they initially begin moving. It is therefore preferable to have a relatively high gain during initial start up and decrease the gain as the machine reaches a steady state speed. One method of doing this is to monitor the right speed sensor signal 330 in a feedforward path 390 and decrease the gain as that speed increases. Although a preferred embodiment uses the right speed sensor signal 330 as an indication of a machine speed that is great enough to permit the gain to be decreased, other sensors could readily and easily be used as a determinant in varying the gain 380. In a preferred embodiment, the gain values are stored in a look-up table which is stored in the electronic control module. However, other methods of calculating the gain, such as an equation based on the right speed sensor signal, could readily and easily be used without deviating from the scope of the present invention. The proportional gain preferably starts at some positive value and decreases to zero when the right speed sensor signal 330 exceeds a predetermined value. The output of block 380 feeds into a proportional limit block 385 which limits the value of the proportional term before it is used as an input to the second summing junction 370.

The integral loop 360 preferably includes an integral term 400 which feeds into a gain term 410. The gain term is an empirically determined value, which those skilled in the art will recognize is dependent on the system dynamics and desired system performance. Preferably, the gain in the integral loop is selected to drive the track speed error to zero sufficiently quickly without unduly sacrificing system response. The output of the gain block 410 is then fed into an integral limit 420 and then fed into the second summing junction 370. The output of the second summing junction is then fed through an error limiting block 430.

The output of block 430 is used as the error signal (i.e., the feedback signal) to a third summing junction 450 and fourth summing junction 470. As shown in FIG. 3, a desired left speed 440 is fed into the third summing junction 450 and a desired right speed 460 is fed into the fourth summing junction 470. The output of block 430 is then added to the third summing junction 450 and subtracted from the fourth summing junction 470. The output of the third summing junction 450 is a control signal 455 that is used as the command signal for a speed control for the left track (not shown). The output of that control is produced by the electronic control module 200 and transmitted to the left variable displacement hydraulic pump 270 over connector 245 to control the flow of hydraulic fluid to the hydraulic motor 285. The output of the fourth summing junction 470 is a control signal 475 that is used as the command signal for a speed control for the right track (not shown). The output of that control is produced by the electronic control module 200 and transmitted to the right variable displacement hydraulic pump 260 over connector 255 to control hydraulic fluid flow to the right hydraulic motor 295. The independent left and right speed controls can take a variety of well known forms. For example, such controls may be open loop or closed loop. Closed loop controls may typically include Proportional-Integral-Derivative terms whose coefficients may vary depending on the system dynamics desired response, desired steady state error, and other design considerations.

In summary, if the right ground engaging propulsion mechanism is travelling faster than the left ground engaging propulsion mechanism, then the right speed signal 330 will be greater than the left speed signal 310 and the output of the summing junction 340 will be positive. In general, depending on the value of the integral term, this will produce a positive output for the limiting block 430 which will cause the left speed control signal 455 to be slightly increased over the desired left speed 440 and will cause the right speed command signal 475 to be slightly decreased over the desired right speed 460.

INDUSTRIAL APPLICABILITY

In a preferred embodiment of the control system of the present invention, the control acts to correct deviations in speed between the left and right ground engaging propulsion mechanisms to cause the asphalt paving machine to maintain a desired heading. Thus, if the right ground engaging propulsion mechanism is travelling faster than the left ground engaging propulsion mechanism, thereby tending to make the asphalt paving machine veer left of the intended course, the control system of the present invention will slightly increase the left ground engaging mechanism and decrease the right ground engaging mechanism, thereby causing the asphalt paver to maintain the desired heading.

To operate the control described and claimed herein, the operator selects a desired paver speed, which is then used as the right and left desired speeds 460, 440 respectively and selects an automatic tracking mode through the operator input 210. The control system then implements a preferred embodiment of the control described herein.

What is claimed is:

1. A control system for use on work machines having ground engaging propulsion mechanisms on a left side and a right side of said machines, comprising:

a first motor associated with said left ground engaging propulsion mechanism;

a first speed sensor associated with the ground engaging propulsion mechanism on the left side of the machine, said first speed sensor producing a left propulsion speed signal;

a second motor associated with said right ground engaging propulsion mechanism;

a second speed sensor associated with the ground engaging propulsion mechanism on the right side of the machine, said second speed sensor producing a right propulsion speed signal;

an operator input producing an input signal;

an electronic controller receiving said left propulsion speed signal and said right propulsion speed signal and said input signal and producing a control signal associated with said first motor and a control signal associated with said second motor to control said first and second motors as a function of said input signal, said left propulsion speed signal and said right propulsion speed signal.

2. The control system according to claim 1, including:

a first variable displacement pump associated with said first motor;

a second variable displacement pump associated with said second motor; and said electronic controller producing said control signals to control said first and second variable displacement pumps.

3. The control system according to claim 1, wherein said first and second motor include hydraulic motors connected with a source of hydraulic pressure.

4. The control system according to claim 1, wherein said electronic control includes a closed loop feedback control, said controller calculating a difference signal representative of the difference between said left propulsion speed signal and said right propulsion speed signal and controlling the first and second motors as a function of said difference signal.

5. The control system according to claim 4, wherein said closed loop feedback includes a proportional gain term and an integral gain term, said proportional gain term being varied depending on an operating condition of said machine.

6. The control system according to claim 5, wherein said proportional gain term is varied as a function of at least one of the left propulsion signal or the right propulsion signal.

7. The control system according to claim 5, wherein said proportional gain term is varied based upon one of the left or right propulsion signal exceeding a predetermined threshold after initial machine startup.

8. The control system according to claim 1, wherein:

said operator input includes a steering input device, said steering input device being biased to a neutral position and outputting a steering input position signal;

and said electronic controller entering an automatic tracking mode in response to said steering input position signal being within a predetermined tolerance of said neutral position.

9. The control system according to claim 2, wherein:

said operator input includes a steering input device, said steering input device being biased to a neutral position and outputting a steering input position signal;

and said electronic controller entering an automatic tracking mode in response to said steering input position signal being within a predetermined tolerance of said neutral position.

10. A method of controlling a work machine having a left and a right ground engaging propulsion mechanism, comprising:

enabling an automatic tracking mode;

determining the speed of said left and right ground engaging propulsion mechanism;

determining a desired work machine velocity; and controlling the speed of said left and right ground engaging propulsion mechanism as a function of said automatic mode, the speed of said left and right ground engaging propulsion mechanism, and the desired work machine velocity.

* * * * *